US010904290B2

(12) United States Patent
Klaedtke

(10) Patent No.: US 10,904,290 B2
(45) Date of Patent: Jan. 26, 2021

(54) METHOD AND SYSTEM FOR DETERMINING INCORRECT BEHAVIOR OF COMPONENTS IN A DISTRIBUTED IT SYSTEM GENERATING OUT-OF-ORDER EVENT STREAMS WITH GAPS

(71) Applicant: NEC Laboratories Europe GmbH, Heidelberg (DE)

(72) Inventor: Felix Klaedtke, Heidelberg (DE)

(73) Assignee: NEC CORPORATION, Tokyo (JP)

( * ) Notice: Subject to any disclaimer, the term of this patent is extended or adjusted under 35 U.S.C. 154(b) by 419 days.

(21) Appl. No.: 15/866,518

(22) Filed: Jan. 10, 2018

(65) Prior Publication Data

US 2019/0215340 A1 Jul. 11, 2019

(51) Int. Cl.
*H04L 29/06* (2006.01)
*G06F 21/55* (2013.01)
(Continued)

(52) U.S. Cl.
CPC ............ *H04L 63/20* (2013.01); *G06F 21/552* (2013.01); *G06F 21/554* (2013.01);
(Continued)

(58) Field of Classification Search
CPC ................. G06F 21/552; G06F 21/554; G06F 2221/2151; H04L 41/069; H04L 41/0631;
(Continued)

(56) References Cited

U.S. PATENT DOCUMENTS 6,182,024 B1 * 1/2001 Gangopadhyay ......... G06F 8/10
345/440
6,516,306 B1 * 2/2003 Alur ....................... G06F 11/28
703/15

(Continued)

OTHER PUBLICATIONS

David Basin, et al., "Failure-aware Runtime Verification of Distributed Systems", 35th IARCS Annual Conference on Foundations of Software Technology and Theoretical Computer Science (FSTTCS 2015), Dec. 2015, pp. 590-603.

(Continued)

*Primary Examiner* — Carl G Colin
*Assistant Examiner* — Han Yang
(74) *Attorney, Agent, or Firm* — Leydig, Voit & Mayer, Ltd.

(57) ABSTRACT

A method for determining incorrect behavior of components in a distributed information technology (IT) system includes receiving a pattern useable to indicate an incorrect behavior of a component. An automaton and a complement automaton are constructed based on the pattern, the automaton and complement automaton comprising one or more states. One or more logged events are received, each event in the one or more logged events including a timestamp. Gaps are determined in the one or more logged events. Event matrices are precomputed for the gaps and for each event in the one or more logged events based on the states of the automaton and the complement automaton. The pattern is matched to the one or more logged events by iteratively processing the one or more logged events and the gaps and maintaining a combination matrix. The incorrect behavior is determined based on an output of the pattern matching.

13 Claims, 9 Drawing Sheets

(51) Int. Cl.
 *H04L 12/24* (2006.01)
 *H04L 29/08* (2006.01)
(52) U.S. Cl.
 CPC ........ *H04L 41/069* (2013.01); *H04L 41/0631* (2013.01); *H04L 63/14* (2013.01); *G06F 2221/2151* (2013.01); *H04L 67/10* (2013.01)
(58) Field of Classification Search
 CPC ..... H04L 63/20; H04L 63/14; H04L 63/1425; H04L 67/10; H04L 2463/121
 See application file for complete search history.

(56) References Cited

U.S. PATENT DOCUMENTS

| | | | | |
|---|---|---|---|---|
| 2006/0242123 | A1* | 10/2006 | Williams, Jr. .... | G06F 16/90344 |
| 2007/0226362 | A1* | 9/2007 | Johnson ................ | H04L 43/18 709/230 |
| 2017/0149813 | A1* | 5/2017 | Wright ................ | H04L 63/1416 |
| 2019/0384689 | A1* | 12/2019 | Klaedtke ............. | G06F 11/3438 |

OTHER PUBLICATIONS

Theodore Johnson, et al., "Monitoring Regular Expressions on Out-of-Order Streams", IEEE 23rd International Conference on Data Engineering, 2007, ICDE 2007, Apr. 15-20, 2017, pp. 1315-1319.

* cited by examiner

METHOD AND SYSTEM FOR DETERMINING INCORRECT BEHAVIOR OF COMPONENTS IN A DISTRIBUTED IT SYSTEM GENERATING OUT-OF-ORDER EVENT STREAMS WITH GAPS

FIELD

The present invention relates to a method and system for determining incorrect behavior of components in a distributed information technology (IT) system generating out-of-order event streams with gaps.

BACKGROUND

Security information and event management (SIEM) tools provide a framework for collecting events from various components of a distributed IT system and analyzing them to identify noncompliant or malicious behavior. SIEM tools use data bases (DBs), data stream management systems (DSMSs), or other stream processing engines to analyze these streams of logged system events either online or offline, where they correlate events from different system components.

The logged system events are then analyzed. In particular, when analyzing the streams in real time, the events should be processed in the rate they are generated. However, the logged system events may not be ordered when received by the SIEM tool. Some of the logged system events may even be missing. That is, events are usually received out of order or may even be lost. Reasons can be logging failures, misconfigured components, network delays, etc. Buffering and ordering events result in delay of reporting malicious or noncompliant behavior. Furthermore, buffering does not handle the loss of events.

SUMMARY

In an embodiment, the present invention provides a method for determining incorrect behavior of components in a distributed IT system generating out-of-order event streams with gaps. The method includes receiving a pattern which is useable to indicate an incorrect behavior of at least one of the components of the distributed IT system; constructing an automaton and a complement automaton based on the pattern, the automaton and complement automaton comprising one or more states; receiving one or more logged events, each event in the one or more logged events including a timestamp, wherein the timestamps provide an order the one or more logged events; determining the gaps in the one or more logged events; precomputing event matrices for the gaps and for each event in the one or more logged events based on the states of the automaton and the complement automaton; matching the pattern to the one or more logged events by iteratively processing the one or more logged events and the gaps and maintaining a combination matrix which is updated in each iteration; and determining incorrect behavior based on an output of the pattern matching.

BRIEF DESCRIPTION OF THE SEVERAL VIEWS OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following.

DETAILED DESCRIPTION

A problem unique to computer networks and solved by embodiments of the present invention is to identify components of a distributed information technology (IT) system that wrongly interact with each other, detect maliciously behaving components, or noncompliant behavior in general. For analysis, the incorrect behavior is specified through patterns. Whenever a pattern matches a stream of logged system events, a violation is reported and appropriate countermeasures are taken, e.g., restarting, terminating, or quarantining a component. It is beneficial to have appropriate pattern matching mechanisms in place. As such, embodiments of the invention provide pattern matching mechanisms that efficiently and correctly handle out-of-order streams of logged system events.

In an embodiment, the invention provides a method that accurately (without false positives or false negatives) and promptly (as soon as possible) detects patterns in logs in the presence of gaps, which can be resolved later without reiterating through the whole log. The method can be used online to analyze logged events in real-time. The method can also handle patterns specifying temporal constraints. The method may be used in applications beyond SIEM tools to correlate system events and identify malicious or noncompliant behavior. For example, the method can also be used in middleboxes to detect patterns of network flows or to verify or debug components of distributed systems at runtime. As opposed to systems which use buffering or perform prior sorting, embodiments of the present invention are able to detect and/or take counter-measures against policy violations with minimal delay.

Figure 1:
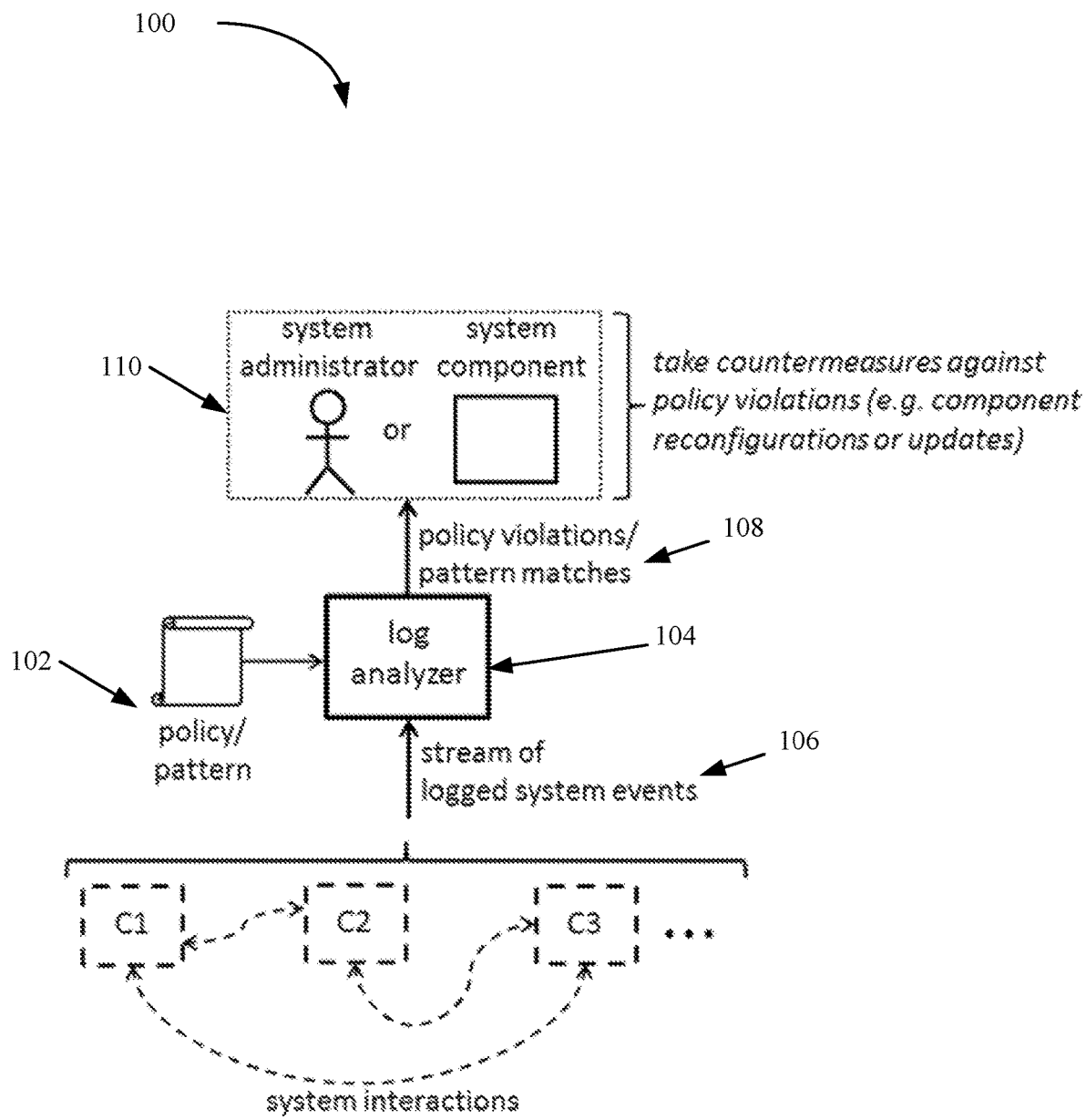
FIG. 1 illustrates a system utilizing a log analyzer, according to an embodiment of the invention.

FIG. 1 illustrates a system 100 utilizing a log analyzer 104 according to an embodiment of the invention. The system 100 includes multiple components (C1, C2, C3, . . . ) that interact with each other, for example, over asynchronous channels. Each of the system components (C1, C2, C3, . . . ) logs actions it performs. Examples of such actions are: opening or closing of a file or socket, and approval of a request of accessing a document. The logged actions or events 106 are collected and analyzed by the log analyzer 104 using a policy/pattern 102. For example, SIEM tools provide such a framework and special engines for correlating events from different system events. The output of analysis 108 can be forwarded to the system administrator or another system component 110 that takes appropriate actions in case of identifying noncompliant or malicious behavior. For example, another system component 110 can terminate or reconfigure system components (C1, C2, C3, . . . ) based on the identified noncompliant or malicious behavior.

In an embodiment, the invention provides a log analyzer 104 for processing a stream of logged system events online. The log analyzer 104 promptly detects patterns (e.g., given by regular expressions) in the processed stream of system events. Furthermore, it efficiently deals with streams in which the events appear out-of-order and may contain gaps. For example, each event has a timestamp, where 1@e1 indicates that event e1 happened at time 1, 2@e2 indicates that e2 happened at time 2, and so on. In an embodiment, these timestamps are given in Unix time, with a precision of milliseconds or even microseconds. The timestamps determine the order in which the events were carried out. Due to network latency, some events may arrive late at the log analyzer 104. For example, although 2@e2 happened after 1@e1, 2@e2 arrives before 1@e1 at the log analyzer 104. In other words, the events at the log analyzer 104 arrive out-of-order. As long as the event has not arrived at the log analyzer 104, then there is a gap. In some cases, an event never arrives at the log analyzer 104, thus, the gap is never resolved. Timestamps are usually provided by a local clock of the component where the events occur. Local clocks may differ, e.g., because of clock drifts. Protocols like Network Time Protocol (NTP) can be used for clock synchronization. NTP and similar protocols achieve a precision in the range of a few milliseconds (or even better).

In an exemplary embodiment, the invention provides an online method for pattern matching in large data sets, e.g., for detecting malicious behavior of system components by analyzing logs from a distributed IT system. Embodiments of the invention improve log analyzers of SIEM engines by allowing them to process log streams that can contain gaps (e.g., missing log entries), and to resolve these gaps later.

In an exemplary embodiment, the invention provides a method for detecting patterns in an event stream. The event stream includes one or more logged events. The method comprises: receiving a pattern; constructing an automaton and a complement automaton based on the pattern, the automaton and complement automaton comprising one or more states; receiving the one or more logged events, each event in the one or more logged events including a timestamp; determining gaps in the one or more logged events; precomputing event matrices for the gaps and for each event in the one or more logged events, the event matrices based on the states of the automaton and the complement automaton; and iteratively processing the one or more logged events and the gaps by maintaining a combination matrix which is updated in each iteration.

An advantage of the method is that it accurately deals with partial information (e.g., missing entries in a log file). Furthermore, pattern matches are output promptly, that is, no buffering and prior sorting of events are necessary. Another advantage of the method is that it allows for efficiently resolving knowledge gaps. Another advantage of the method is that it allows for processing data (e.g., log entries) online but not requiring that they are received in the order as the data is produced. Another advantage of the method is that it supports an efficient and scalable implementation (e.g., parallelization). The method provides advantages to improvement of computer networks. For example, in the advent of Internet of Things (IoT) platforms, multiple IoT devices will wirelessly communicate with one another, presenting a challenge in secure/error-free communication in crowded a crowded network space. The method allows a network/system administrator to monitor and identify patterns in networked interactions for discrete IoT platforms, allowing prompt intervention when error patterns, noncompliant, or malicious behaviors are detected. The method not only improves IoT platforms, but can also improve security in security operations centers (SOCs).

The method when compared to the prior art holds several advantages. For example, Johnson et al., US Patent Publication US 2007/0226362 A1, and T. Johnson et al., "Monitoring Regular Expressions on Out-Of-Order Streams" (ICDE) 2007, both of which are hereby incorporated by reference herein, do not deal with gaps. Johnson et al. and T. Johnson et al. only deal with out-of-order events but not with incomplete streams. Furthermore, pattern matches are not always output promptly. Additionally, Johnson et al. and T. Johnson et al. are single threaded processes that require deterministic automaton and cannot directly deal with nondeterministic automata.

Figure 2:
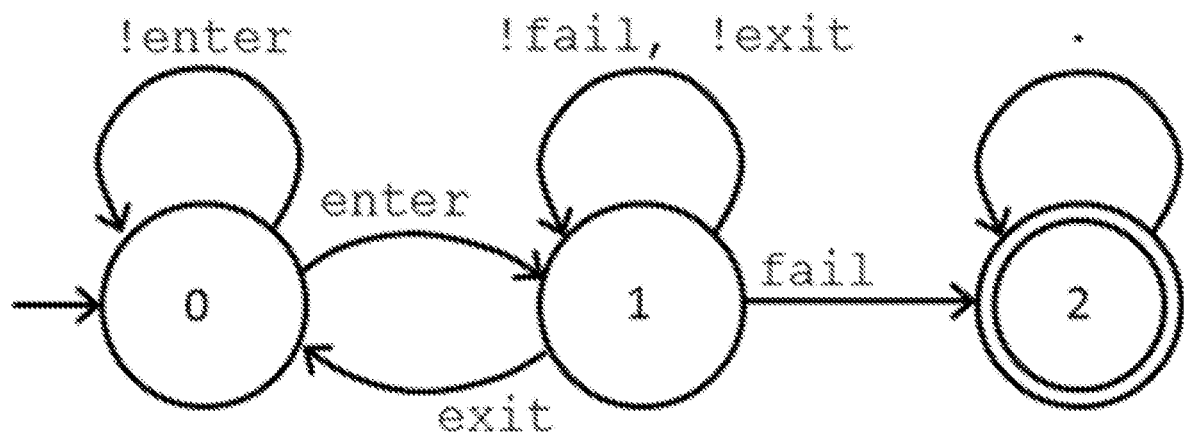
FIG. 2 illustrates a minimal deterministic finite automaton, according to an embodiment of the invention.

A brief discussion of automata and matrices is provided. Finite automata or regular expressions are often at the core of pattern specification languages for identifying malicious or noncompliant behavior. FIG. 2 illustrates an example of a minimal deterministic finite automaton according to an embodiment of the invention. In the example of FIG. 2, a simple pattern is that there must not be a fail in the critical section. A corresponding regular expression is .*;enter; !exit*;fail;.*, where the events enter, exit, and fail mark the entering into the critical section, the exit of the critical section, and a failure, respectively. Furthermore, the symbol . denotes any event, the symbol ; denotes the sequencing of events, the symbol ! denotes the absence of the specified event, and the symbol * denotes the unbounded repetition (0 or more times) of an event.

In FIG. 2, assume that an enter event of a component is not logged when entering the critical section, but the component fails and sends the corresponding fail event. In this case, conventional solutions of the prior art would miss the violation. In fact, these solutions would classify the behavior as correct, thus, providing a false positive. It is not difficult to see that conventional solutions can also produce false negatives.

In the following, let A be a finite automaton with N states. Without loss of generality, assume that A's states are 0, 1, . . . , N−1, where 0 is A's single initial state. See FIG. 2 for an example, where the states with a double circle are the accepting states. Rejecting states are drawn in FIG. 2 with a single circle. If the automaton stops in an accepting state, it accepts the input word. Otherwise, it rejects the input word. In FIG. 2, state 2 is an accepting state. Furthermore, state 2 is a sink state, which indicates that whenever state 2 is reached by a prefix of the input word, no other states can be reached from state 2 ("a fail cannot be repaired"). Note that the pattern in the FIG. 2 example describes a situation that something should not happen. In other words, it is a "bad thing" when reaching the state 2.

The transitions for A for the letter b can be represented by an N×N Boolean matrix $T_b^A$. The entry in row i and column j is 1 if and only if there is a transition from state i to state j with the letter b. The superscript A is omitted when it is clear from the context. For example, for the automaton in FIG. 2, the matrices $T_{enter}$ and $T_{exit}$ are as follows:

$$T_{enter} = \begin{bmatrix} 0 & 1 & 0 \\ 0 & 1 & 0 \\ 0 & 0 & 1 \end{bmatrix} \text{ and } T_{exit} = \begin{bmatrix} 1 & 0 & 0 \\ 1 & 0 & 0 \\ 0 & 0 & 1 \end{bmatrix}$$

These matrices are generalized from letters to sets of words. For a language L (i.e., a set of words), the entry in row i and column j of the matrix $T_L^A$ is 1 if and only if the state j is reachable from the state i via some word in L. Again, the superscript is omitted when it is clear from the context. For the singleton L={b}, where b is a letter, $T_L$ is equal to $T_b$. Furthermore, for the singleton L that consists of the empty word, $T_L$ is the unit matrix U with elements 1 on the diagonal (left to right) and the other elements being 0. The dimension of the unit matrix is determined by the number of states of the automaton (n states implies an n×n matrix). As such, the unit matrix is uniquely determined by the given input.

Matrix multiplication corresponds to sequencing. For example, the entry in row i and column j in the matrix $$T_{\{enter\}} * T_{\{exit\}} = T_{\{enter,exit\}} = \begin{bmatrix} 1 & 0 & 0 \\ 1 & 0 & 0 \\ 0 & 0 & 1 \end{bmatrix}$$

is 1 if and only if the state j is reachable via the word enter; exit from the state i.

In the following, $R^A$ denotes the matrix of the automaton's A reachable states. This means, the entry in row i and column j in the matrix $R^A$ is 1 if and only if the state j of A is reachable from the state i of A via some word. Again, the superscript A is omitted when it is clear from the context. Note that $R=T_L$, where L is the set of all words.

A brief discussion of events and streams is provided. An event can be a logged system event, like entering or exiting a critical section. Furthermore, events can be structured and can contain meta-information, e.g., through Extensible Markup Language (XML) tags. A stream E is a sequence of events $e_0; e_1; e_2; \ldots$. Streams are usually given incrementally. In each iteration, the next event of the stream is provided. The events of the stream E might however appear out-of-order. For instance, if the events of the stream are timestamped, it can be the case that the timestamp of $e_i$ is larger than the timestamp of $e_j$, although $e_i$ appears before $e_j$, i.e., i<j. Furthermore, the stream can be incomplete, i.e., not all events are contained in the stream. Thus, different scenarios may be considered for a stream, that is, for given events $e_i$ and $e_j$, a determination may be made on: (1) whether $e_i$ happened before $e_j$ and (2) whether some event happened before $e_j$ and whether $e_i$ happened directly before $e_j$ (i.e., no events between the two).

The determination of (1) may be achieved by timestamping the events in E. The order of the events' timestamps determine the order of occurrence of the events. The determination of (2) may be achieved by including in each event the event source (i.e., the system component (C1, C2, C3, . . . ) that generated the event) and its sequence number. D. Basin et al., "Failure-Aware Runtime Verification of Distributed Systems" FSTTCS (2015), which is hereby incorporated by reference herein, provide further details on the determination of (2). For n≥0, ord(E, n) denotes the first n events of E ordered by their timestamp, where gaps are marked by the special symbol _. Sequence numbers are different from timestamps and can be used to identify gaps in some embodiments. That is, each system component maintains a counter. Whenever a system component sends a message, the system component increases its counter and attaches the counter value to the message. When the log analyzer receives two messages from the same system component, the log analyzer can determine from the sequence numbers whether a message from the system component is missing or not. A system component may regularly send (e.g., every second) "alive" messages. These messages may only contain the system component's sequence numbers and can be used by the log analyzer to determine whether events from the system component are missing).

Patterns are thus determined based on event sequences. They do not include timestamps and sequence numbers. Neither do they include the event source (unless the event source is part of the event described by the message). In other words, timestamps are used to order the events, and sequence numbers are used to identify gaps. For example, a pattern could be "e1 after e2" (as regular expression: .* e1 .* e2 .*). The events e1 and e2 can be sent from the same event source or from different event sources.

Pattern Matching

In an embodiment, it is assumed that the pattern is given as a finite automaton A with N states. Let B be an automaton that accepts the complement of A. Without loss of generality, A's states are 0, 1, . . . , N−1 and B's states are 0, 1, . . . , M−1. Furthermore, assume that 0 is the initial state of both A and B.

In an embodiment, the invention provides a method that checks whether the automaton A accepts or rejects an iteratively given input. The input is given by a stream $E=e_0; e_1; e_2; \ldots$. More precisely, the method processes the events $e_n$ of the stream E iteratively, for n=0, 1, 2, . . . . For each n, a verdict is promptly outputted whenever the pattern matches the input word ord(E, n). The method also promptly outputs verdicts when the pattern does not match. Note that ord(E, n) corresponds to the ordered events received so far and may include gaps, which are denoted by the special letter _. Gaps may get resolved or refined in later iterations.

Evaluation Trees: an evaluation tree stores intermediate results of a finite sequence of entities that are combined by an associative operator. Matrix multiplication is an instance of such an operator. Furthermore, the sequence can contain placeholders, which are refined later.

In the following, let $*:D\times D\to D$ be the associative operator. Furthermore, let $b_0; b_1; \ldots; b_{n-1}$ be a finite sequence with $b_i \in D$. The special element $\_ \in D$ represents placeholders. Assume that each $b_i$, with $b_i \neq \_$, is associated with a timestamp $\tau_i$, and the $b_i$s are ordered by their timestamps, i.e., $\tau_i < \tau_j$, for all i,j with $b_i \neq \_$, $b_j \neq \_$, and 0≤i<j<n.

An evaluation tree for the sequence $b_0; b_1; \ldots; b_{n-1}$ is a binary tree, where its frontier is $b_0; b_1; \ldots; b_{n-1}$. Furthermore, each leaf of the evaluation tree has pointers to its neighbor leaves. An inner node of the tree stores the outcome of the operator * applied to its children nodes. In particular, the root of the evaluation tree stores $b_0*b_1* \ldots *b_{n-1}$. Furthermore, each inner node has a search condition for determining the node's child node that contains leaves with timestamp τ.

A node that has a placeholder as one of its leaves is incomplete. Otherwise, if all leaves are not placeholders, the node is complete. An evaluation tree is reduced if all its inner nodes are incomplete. Note that since the operator * is associative, different evaluation trees exist for the same sequence. However, they all store the same result at their roots.

Figure 3:
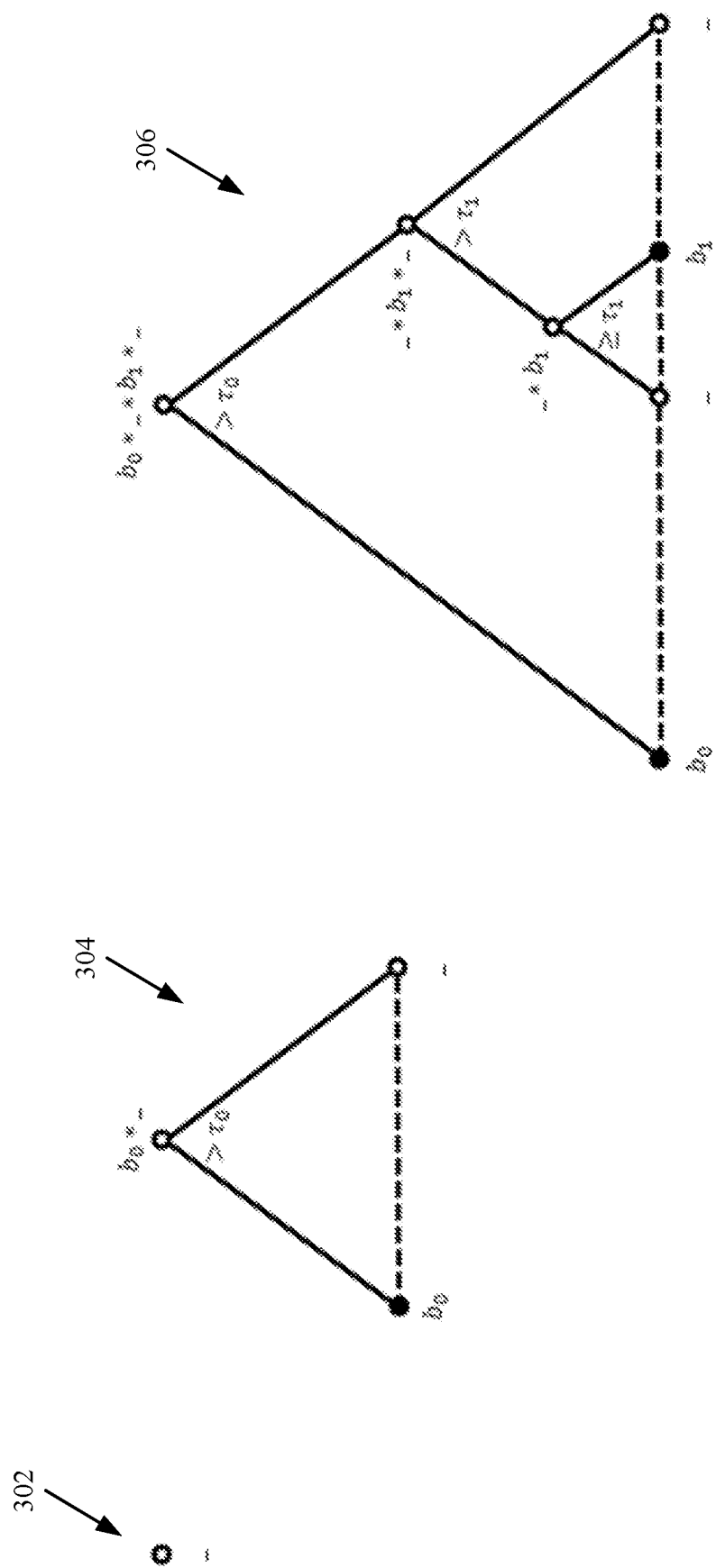
FIG. 3 illustrates evaluation trees, according to an embodiment of the invention.

According to an embodiment of the invention, FIG. 3 illustrates three evaluation trees (302, 304, and 306) for the sequences _, $b_0$; _, and $b_0$; _; $b_1$; _, respectively, where $\tau_0$ and $\tau_1$ are the associated timestamps of the respective elements in the sequences. The evaluation tree 302 on the left-hand side of FIG. 3 is the initial evaluation tree. It consists of a single node with the placeholder _. The node is incomplete, which is marked by a circle (complete nodes are marked by a black dot). The evaluation tree 304 in the middle of FIG. 3 is a refinement of the evaluation tree 302, where the initial placeholder has been refined by $b_0$; _. The root—the only inner node of evaluation tree 304—stores the result of the operator * applied to the node's children. Furthermore, the inner node has the search condition that leaves with a timestamp greater than $\tau_0$ are stored in the node's right subtree. Finally, each leaf of the evaluation tree is connected to its successor leaf and predecessor leaf. These connections are represented by the dashed line. The evaluation tree 306 on the right-hand side of FIG. 3 shows in turn a refinement of the evaluation tree 304. The only placeholder of the evaluation tree 304 in the middle of FIG. 3 has been refined by _; $b_1$; _.

Figure 4:
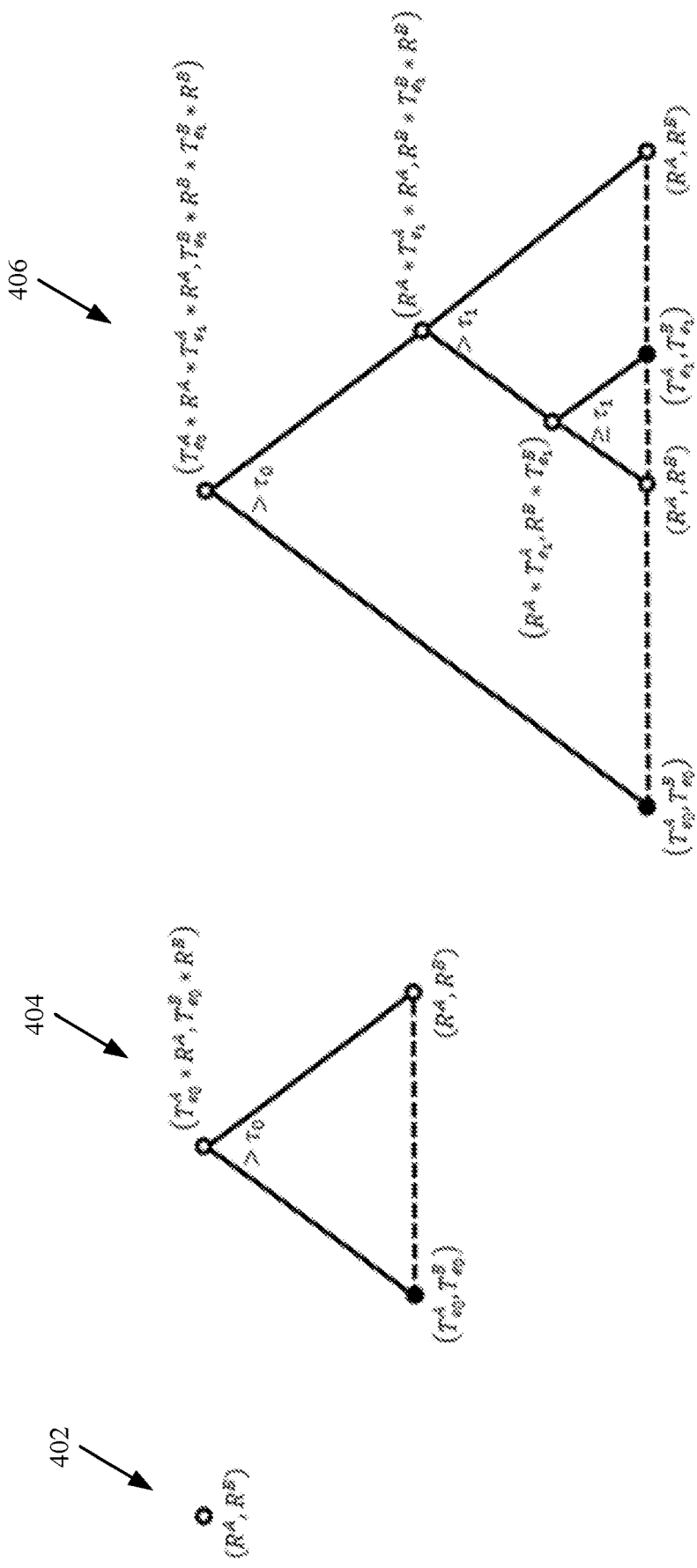
FIG. 4 illustrates evaluation trees with matrix pairs, according to an embodiment of the invention.

FIG. 4 illustrates concretized versions of the evaluation trees of FIG. 3 according to an embodiment of the disclosure. In FIG. 4, the domain D and the associative operator * have been concretized. Namely, D is the set of pairs of square Boolean matrices for the automata A and B, and * is matrix multiplication lifted to pairs of matrices. Furthermore, for the stream E, ord(E, 2)=$e_0$; _; $e_1$; _, where intuitively $e_0$ corresponds to $b_0$ and $e_1$ to $b_1$. Note that the placeholder _ is the matrix pair ($R^A$, $R^B$). Furthermore, note that the events $e_0$ and $e_1$ determine the matrix pairs ($T_{e_0}^A$, $T_{e_0}^B$) and ($T_{e_1}^A$, $T_{e_1}^B$).

Figure 5:
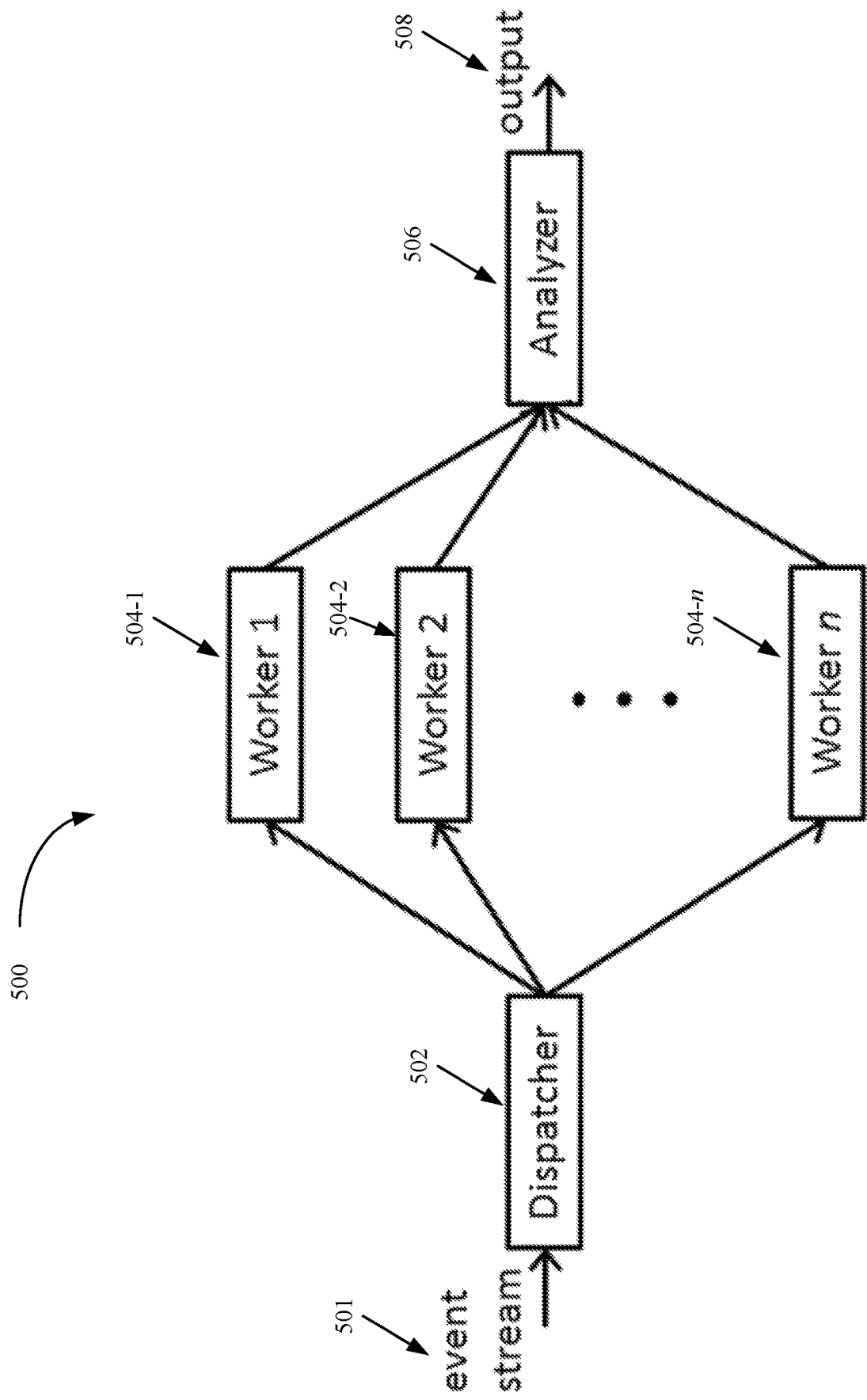
FIG. 5 illustrates a pipeline for processing event streams, according to an embodiment of the invention.

Pipeline Processing: FIG. 5 illustrates a pipeline 500 for processing event streams, e.g., the events of the stream E, according to an embodiment of the disclosure. The events may be processed by the pipeline 500 which includes a dispatcher 502, one or more workers 504, and an analyzer 506. The pipeline 500 maintains an evaluation tree. The dispatcher 502 receives the events of the event stream 501 and processes them iteratively. For each received event, the dispatcher 502 looks up the gap the event resolves or refines, and forwards the event together with the gap to one of the workers 504. The selected worker processes the event by updating a global data structure of the pipeline 500, which a detailed embodiment is provided in detail below. The workers 504 may process multiple events in parallel. The analyzer 506 is triggered by a worker whenever the worker completes processing an event. The analyzer 506 determines the output 508.

In an embodiment, the dispatcher 502 receives the events of the stream 501. For each received event, it looks up the gap the event fills or refines. The dispatcher 502 starts from the root of the evaluation tree and uses the nodes' search condition to find the leaf representing the gap. Depending on how the gap is refined, the dispatcher 502 selects the leaf or one of its neighbors to update the evaluation tree. Furthermore, the dispatcher 502 selects a worker 504, e.g., worker 504-4, that should perform the update. The selected leaf together with the received event is forwarded to the selected worker 504.

Figure 6:
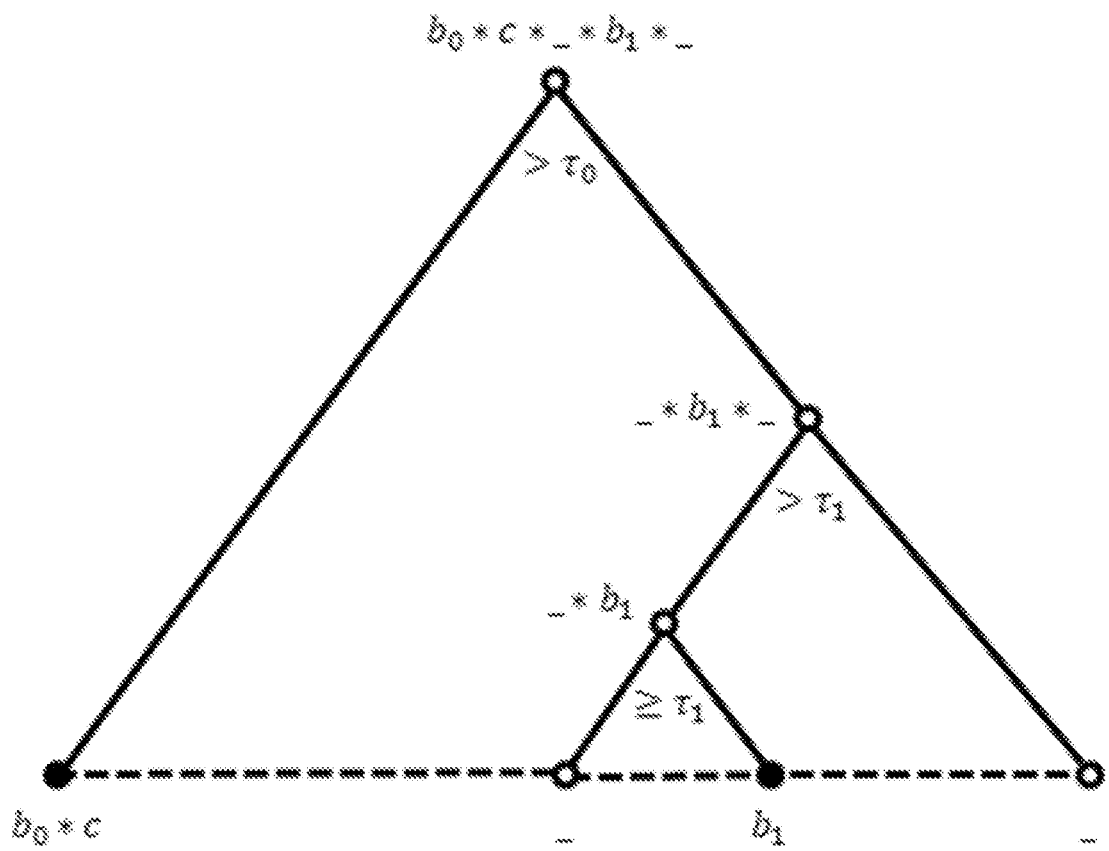
FIG. 6 illustrates an update of an evaluation tree, according to an embodiment of the invention.
Figure 7:
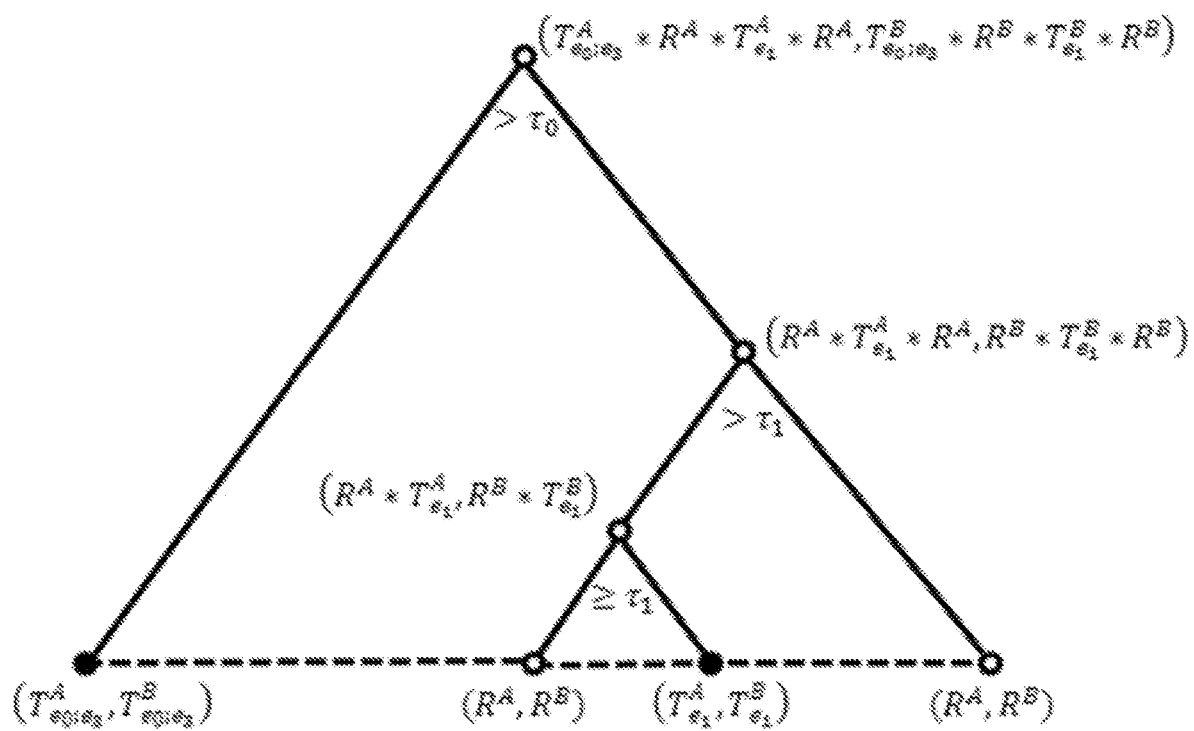
FIG. 7 illustrates an update of an evaluation tree with matrix pairs, according to an embodiment of the invention.

FIG. 6 illustrates an update of an evaluation tree according to an embodiment of the invention. In the evaluation trees in FIG. 3 (and FIG. 4), the dispatcher always selected the leaf of the gap that was refined by the received event. For the evaluation tree in FIG. 6, the dispatcher selected another leaf. The evaluation tree in FIG. 6 is a refinement of the evaluation tree 306 on the right-hand side of FIG. 3 by c; _, where for c's timestamp $\tau$, the following relationship holds: $\tau_0 < \tau < \tau_1$. FIG. 7 illustrates a concretized version of FIG. 6. In FIG. 7, the domain D and the associative operator * have been concretized.

A rationale behind this selection in FIG. 6 (and FIG. 7) is that fewer nodes of the evaluation tree need to be updated, and the height of the updated evaluation tree does not increase. In general, a greedy strategy is to preference leaves that do not increase the height of the evaluation and to optimize for the number of nodes to the root. Note that since there are no further events between $b_0$ and c, it suffices that the left-most leaf of the evaluation tree in FIG. 6 only stores the result of the application of the operator *.

Figure 8:
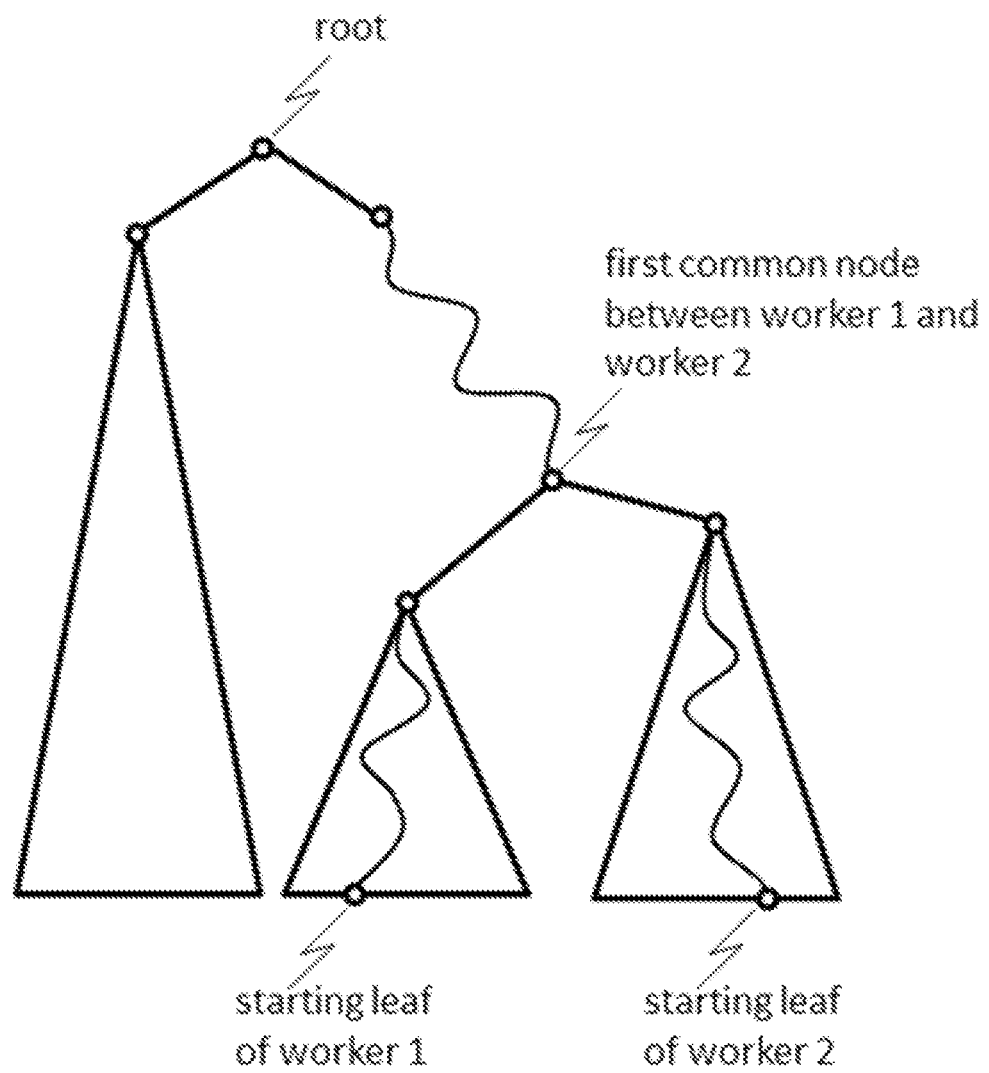
FIG. 8 illustrates a parallel update of an evaluation tree by multiple workers, according to an embodiment of the invention.

In an embodiment, a worker 504-1 updates the evaluation tree bottom-up, starting from the leaf provided by the dispatcher 502. The worker 504-1 propagates the update to the root of the evaluation tree. Multiple workers 504 can work in parallel, propagating different results bottom-up. However, for updating the evaluation tree correctly, the dispatcher 502 and the workers 504 lock nodes. A locked node is a node that cannot be updated by another worker. The locks are released by the workers 504 after the node has been updated. FIG. 8 illustrates parallel updates of an evaluation tree by multiple workers according to an embodiment of the invention. In FIG. 8, two workers (worker 1 and worker 2) update the evaluation tree by propagating their results bottom-up in parallel. The starting leaves are determined by the dispatcher 502. One of the workers may get blocked when it arrives at a common node on the way to the root. Recall that nodes are locked while being updated by a worker.

In an embodiment, the analyzer 506 receives from a worker, e.g., worker 504-1, the stored element at the root of the evaluation tree. Based on an application dependent analysis, the analyzer 506 produces the output 508. As previously described, given that the root of the evaluation tree stores a matrix pair (T, S), where the matrix T is from the automaton A and the matrix S from the automaton B, for regular expression matching, the analyzer 506 performs the following steps:
  a. Based on the matrix T, determine the set I of reachable states from the automaton A's initial state 0.
    1. If I contains only accepting states, output "match."
    2. If I contains no accepting states, output "no match."
  b. Otherwise, if I contains accepting and rejecting states: Based on the matrix S, determine the set J of reachable states from the automaton B's initial state 0.
    1. If J contains no accepting states, output "match."
    2. If J contains only accepting states, output "no match."
  c. Otherwise, if both sets I and J contain accepting and rejecting states of the respective automata A and B, then there is no output. Depending on how the gaps are filled later, there can be a match or no match.

Matrix Representation and Multiplication: A tailored representation of the Boolean square matrices is essential for performing pattern matching with gaps efficiently. In an embodiment, a representation of a Boolean square matrix M is as follows:
  a. Each row i of M is represented as a set $post_M(i)$. This set contains an integer j, where j ranges over M's columns, if and only if M's entry at row i and column j is 1.
  b. Each column j of M is represented as a set $pre_M(j)$. This set contains an integer i, where i ranges over M's rows, if and only if M's entry at row i and column j is 1.

Matrix multiplication on this set-based representation can be carried out efficiently. For instance, matrix multiplication can be parallelized by using green threads and multiple central processing unit (CPU) and/or graphical processing unit (GPU) cores. In particular, the pre and post sets of a matrix can be computed in parallel.

In an embodiment, these pre and post sets can be represented as bit sets (a data structure that is available in standard libraries of many program languages). Note that when representing sets over a prefix of the natural numbers as bit sets, operations like union and intersection are essentially bit operations over 64-bit integers on current state-of-the-art computers. Furthermore, the bit set presentation is very compact for small matrices. For example, when the number of rows and columns of the matrix M is at most 64, each of these sets is represented by a single 64-bit integer.

In an embodiment, the application context lends to another optimization which may originate from the fact that many multiplication operations S*T of two matrices S and T are "refinements" of a multiplication S'*T or S*T', where S' and T' are matrices that "have more 1 s than" S and T, respectively. More precisely, the entry at row i and column j in S (or T) is 1 whenever the entry of S' (or T') at the same position is 1. Instead of multiplying S and T from scratch, the matrix that obtained from earlier multiplication of S' and T (or S and T', respectively) are updated.

a. For the update of S'*T, it suffices to consider the integers i for which the post sets of S have changed from S'. When updating the matrix S'*T (i.e., the post set and pre set), a determination of the integers for which the post set and the pre set of S*T have changed is also made. A sample code showing the update procedure is provided.

```
procedure M.Update1(S, T : BoolMatrix, Cpost : BitSet) : (BitSet,
BitSet) {
    Dpost, Dpre ← Ø, Ø
    for p ∈ Cpost {
        Post ← Ø
        for q in S.post[p] {
            Post ← Post ∪ T.post[q]
        }
        Removed ← M.post[p] \ Post
        if Removed = Ø {
            Dpost, Dpre ← Dpost ∪ {p}, Dpre ∪ Removed
            M.post[p] ← Post
            for q ∈ Removed {
                M.pre[q] ← M.pre[q] \{p}
            }
        }
}
``` b. For the update of S*T', it suffices to consider the integers j for which the pre set of T have changed from T'. The details are analogous to the above case and omitted.

Note that in the special case where no post set or pre set has changed, no update needs to be performed.

Note 1. If the automaton A is deterministic, the complement automaton B can be easily obtained from the automaton A. In particular, the transition relations of both automata are isomorphic. Furthermore, the set of accepting states of one automaton is the complement of the set of accepting states of the other automaton. Therefore, the matrices at each node in the evaluation tree are identical, and the worker and the analyzer can be optimized accordingly.

Note 2. In a preprocessing step, an attempt can be made to reduce the state spaces of the automata A and B. Reduced state spaces would result in a smaller dimension of the matrices, and this would consequently result in speed ups in each iteration of the worker and the analyzer. Deterministic automata can be efficiently minimized. For nondeterministic automata, heuristics can be applied. In some cases, it might be beneficial to determinize a nondeterministic automaton in a preprocessing step (and minimize it afterwards, cf. Note 1 above), although the exponential blowup is the worst case for determinizing nondeterministic automata. However, note that if both nondeterministic automata A and B are small compared to the determinization of A, it is still benefical to use A and B.

Note 3. Gaps might be constraint. Such a constraint is reflected in the pair of the matrices in the corresponding evaluation tree representing the gap. For example, if the constraint is that only events of a special kind are missing, one would not use the matrix pair ($R^A$, $R^B$). Instead, a matrix pair ($T_L^A$, $T_L^B$) would be used, where L contains all words over those events. When the constraint is known in advance, the corresponding matrices for the gaps can be precomputed, similar to the matrices $R^A$ and $R^B$ for gaps with no constraints.

Note 4. When a gap will not be resolved later, the corresponding leaf in the evaluation tree can be merged with its neighbors. By merging leaves, the size of the evaluation tree can be reduced.

Extended Patterns

Patterns are often specified by regular expressions. In this case, the given regular expressions can be translated in a preprocessing step into nondeterministic automata in linear time.

Patterns specified by formulas of temporal logics, like linear temporal logic (LTL) and the property specification language (PSL), can also be translated into nondeterministic automata. However, when semantics of the respective temporal logic is defined over infinite words, these automata use extended acceptance conditions. A commonly used acceptance condition is the Buchi acceptance condition. To correctly handle such acceptance conditions, slight modifications to the workers 504 in the pipeline 500 of FIG. 5 are made. Instead of directly forwarding the updated matrix pair at the root to the analyzer 506, the worker first multiplies the matrix for the automaton A with the matrix $F^A$. The matrix $F^A$ contains a 1 at row i and column j if and only if: (1) the state j is reachable from the state i, the state j is accepting, and the state j contains a loop; or (2) the state j is reachable from the state i, the state j is not accepting, and the state j contains a loop with no accepting states on it. The matrix for the automaton B is similarly updated.

Embodiments of the invention provide a method and data structure to promptly, accurately, and efficiently detect patterns in event streams in which the events may appear out-of-order or may have gaps (i.e., missing/lost events) by: (a) converting the pattern/policy into an automaton, (b) constructing the complement automaton for the complement of the pattern, and (c) using both to check for pattern matches. The method also dispatches received events based on a tree structure to process multiple events in parallel. The method also optimizes result aggregation by leveraging matrix multiplication and previously computed intermediate results.

Figure 9:
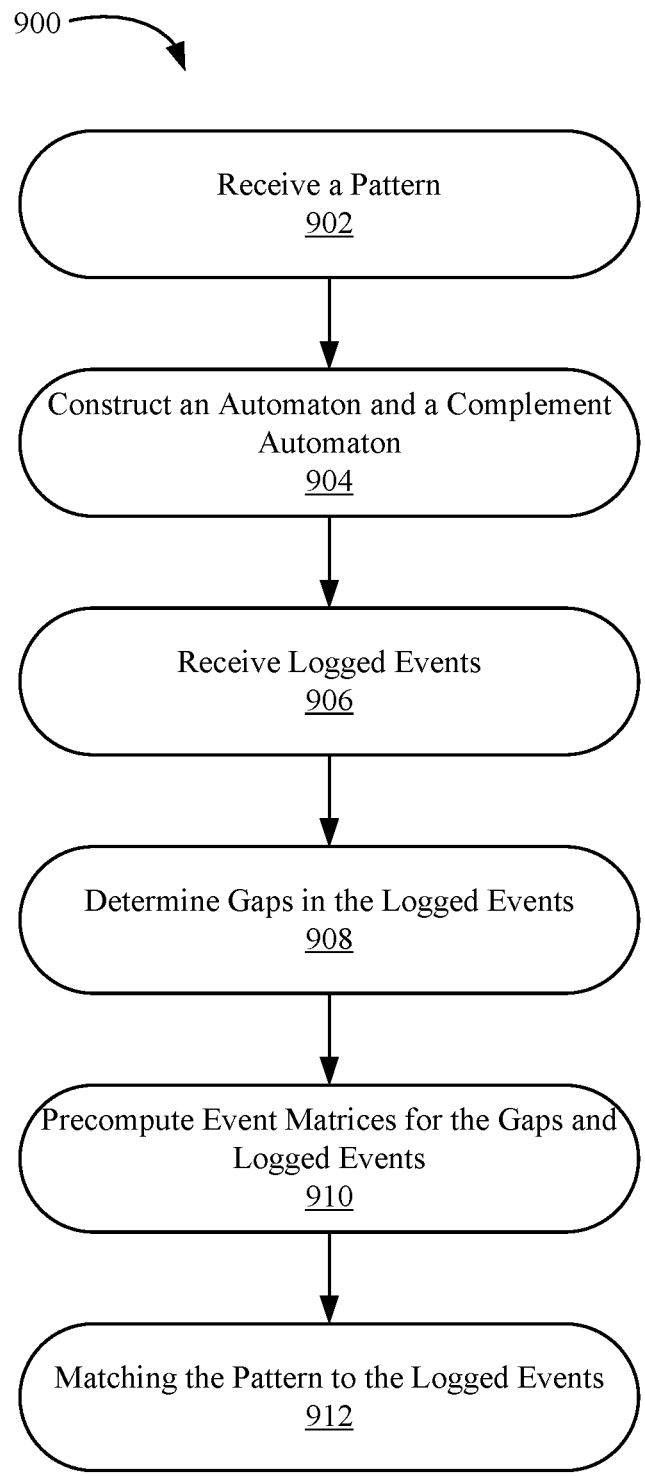
FIG. 9 is a flow diagram illustrating a process for detecting patterns in an event stream, according to an embodiment of the invention.

FIG. 9 is a flow diagram illustrating a process 900 for detecting patterns in an event stream that includes one or more logged events, according to an embodiment of the invention. The process 900 may be performed by a log analyzer, e.g., log analyzer 104. At step 902, the log analyzer 104 receives a pattern/policy 102. The pattern/policy 102 may be provided by a network or system administrator as a regular expression.

At step 904, the log analyzer 104 constructs an automaton and a complement automaton based on the pattern/policy 102. The automaton and complement automaton includes one or more states.

At step 906, the log analyzer 104 receives one or more logged events, e.g., the stream of logged system events 106. A timestamp is included in each of the logged events. The one or more logged events are continuously received during runtime, thus, not all events to be analyzed may be received at once. The loop from step 912 to step 906 is used to indicate this continual process where events are being received and an evaluation tree being updated whenever an event is received (steps 908 and 910). As such, steps 908 and 910 may be performed before step 906, depending on logged events continually rolling in during runtime.

At step 908, the log analyzer 104 determines gaps in the logged events.

At step 910, the log analyzer 104 precomputes event matrices for the gaps and for each logged event. The event matrices are based on the states of the automaton and the complement automaton.

At step 912, the log analyzer 104 matches the pattern to the one or more logged events by iteratively processing the logged events and the gaps and maintaining a combination matrix which is updated in each iteration.

All references, including publications, patent applications, and patents, cited herein are hereby incorporated by reference to the same extent as if each reference were individually and specifically indicated to be incorporated by reference and were set forth in its entirety herein.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

What is claimed is:

1. A method for determining incorrect behavior of components in a distributed information technology (IT) system generating out-of-order event streams with gaps, the method comprising:

receiving a pattern which is useable to indicate an incorrect behavior of at least one of the components of the distributed IT system;

constructing an automaton and a complement automaton based on the pattern, the automaton and the complement automaton comprising one or more states;

receiving one or more logged events, each event in the one or more logged events including a timestamp, wherein the timestamps provide an order of the one or more logged events;

determining the gaps in the one or more logged events;

precomputing event matrices for the gaps and for each event in the one or more logged events based on the states of the automaton and the complement automaton;

matching the pattern to the one or more logged events by iteratively processing the one or more logged events and the gaps and maintaining a combination matrix which is updated in each iteration; and determining the incorrect behavior based on an output of the pattern matching, wherein each event of the one or more logged events and each of the determined gaps is organized in an evaluation tree that is updated based on each received event, and wherein the evaluation tree is a binary tree having nodes that are evaluated in parallel, the nodes storing the event matrices for the gaps and for each event in the one or more logged events.

2. The method according to claim 1, wherein the output is one of a match, a no match, and an undetermined.

3. The method according to claim 1, further comprising:
initiating a counter-measure for at least one of the components determined to be behaving incorrectly based on the output of the pattern matching, wherein the countermeasures include at least one of restarting, reconfiguring, terminating or quarantining the at least one of the components of the distributed IT system.

4. The method according to claim 1, wherein the combination matrix is initially set to a unit matrix.

5. The method according to claim 1, wherein the iteratively processing includes updating the combination matrix with the event matrix for a selected event in the one or more logged events.

6. The method according to claim 1, wherein the iteratively processing includes updating the combination matrix with the event matrix for a selected gap in the gaps.

7. The method according to claim 1, wherein the iteratively processing is performed using parallel computing.

8. The method according to claim 1, wherein each event in the one or more logged events includes a sequence number, wherein the sequence number is used to determine the gaps.

9. The method according to claim 8, wherein each event in the one or more logged events further includes an event source, wherein the event source identifies one of the components that created the logged event.

10. A log analyzer for determining incorrect behavior of components in a distributed information technology (IT) system generating out-of-order event streams with gaps, the log analyzer comprising one or more hardware processors, which alone or together, are configured to provide for execution of the following steps:

receiving a pattern which is useable to indicate an incorrect behavior of at least one of the components of the distributed IT system;

constructing an automaton and a complement automaton based on the pattern, the automaton and the complement automaton comprising one or more states;
receiving one or more logged events, each event in the one or more logged events including a timestamp, wherein the timestamps provide an order of the one or more logged events;
determining the gaps in the one or more logged events;
precomputing event matrices for the gaps and for each event in the one or more logged events based on the states of the automaton and the complement automaton;
matching the pattern to the one or more logged events by iteratively processing the one or more logged events and the gaps and maintaining a combination matrix which is updated in each iteration; and
determining the incorrect behavior based on an output of the pattern matching,
wherein each event of the one or more logged events and each of the determined gaps is organized in an evaluation tree that is updated based on each received event, and
wherein the evaluation tree is a binary tree having nodes that are evaluated in parallel, the nodes storing the event matrices for the gaps and for each event in the one or more logged events.

11. The log analyzer according to claim 10, wherein the output is one of a match, a no match, and an undetermined.

12. The log analyzer according to claim 10, wherein the one or more processors are further configured to provide for execution of a step of:
initiating a counter-measure for at least one of the components determined to be behaving incorrectly based on the output of the pattern matching, wherein the counter-measures include at least one of restarting, reconfiguring, terminating or quarantining the at least one of the components of the distributed IT system.

13. The log analyzer according to claim 10, wherein the updating the combination matrix includes updating the combination matrix with the event matrix for a selected event in the one or more logged events and updating the combination matrix with the event matrix for a selected gap in the gaps.

* * * * *